United States Patent
Miller

(10) Patent No.: US 11,576,404 B2
(45) Date of Patent: Feb. 14, 2023

(54) ISOFLAVONE-SUPPLEMENTED MILK REPLACERS AND SYSTEMS AND METHODS OF FEEDING SAME TO YOUNG ANIMALS

(71) Applicant: PURINA ANIMAL NUTRITION LLC, Shoreview, MN (US)

(72) Inventor: Bill L. Miller, Labadie, MO (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 592 days.

(21) Appl. No.: 15/365,442

(22) Filed: Nov. 30, 2016

(65) Prior Publication Data
US 2018/0146697 A1 May 31, 2018

(51) Int. Cl.
| | |
|---|---|
| A23K 20/10 | (2016.01) |
| A23K 50/30 | (2016.01) |
| A23C 11/02 | (2006.01) |
| A23K 20/121 | (2016.01) |
| A23K 50/60 | (2016.01) |

(52) U.S. Cl.
CPC ............ *A23K 20/10* (2016.05); *A23C 11/02* (2013.01); *A23K 20/121* (2016.05); *A23K 50/30* (2016.05); *A23K 50/60* (2016.05); *A23C 2240/15* (2013.01); *A23V 2002/00* (2013.01)

(58) Field of Classification Search
CPC ...... A23K 20/121; A23K 50/60; A23K 50/30; A23K 20/10
See application file for complete search history.

(56) References Cited

U.S. PATENT DOCUMENTS

| | | | |
|---|---|---|---|
| 2,751,303 A * | 6/1956 | Burroughs ............ | A23K 20/184 514/734 |
| 5,506,211 A | 4/1996 | Barnes et al. | |
| 8,518,921 B2 | 8/2013 | Pan | |
| 2003/0108619 A1 | 6/2003 | Yamaguchi | |
| 2007/0275152 A1 * | 11/2007 | Cook ..................... | A23K 10/30 426/630 |
| 2012/0277300 A1 | 11/2012 | Pan | |
| 2013/0280369 A1 * | 10/2013 | Miller .................. | A23K 20/158 426/2 |
| 2019/0166884 A1 | 6/2019 | Miller et al. | |

FOREIGN PATENT DOCUMENTS

| | | | | |
|---|---|---|---|---|
| CN | 104431614 | | 3/2015 | |
| CN | 104855705 A | | 8/2015 | |
| CN | 105533210 | | 5/2016 | |
| CN | 105614071 | | 6/2016 | |
| CN | 105614104 | | 6/2016 | |
| EP | 2921060 A1 * | | 9/2015 | ............ A23C 11/06 |
| WO | 0237987 A1 | | 5/2002 | |

OTHER PUBLICATIONS

Grgic et al., "Isoflavones in Animals: Metabolism and Effects in Livestock and Occurrence in Feed". Toxins 2021, 13, 836. (Year: 2021).*
Chen, A C; Berhow, M A; Tappenden, K A; Donovan, S M, "Genistein inhibits intestinal cell proliferation in piglets", Pediatric Research 57.2 (Feb. 2005): 192-200.
Greiner, L L; Stahly, T S; Stabel, T J, "The effect of dietary soy genistein on pig growth and viral replication during a viral challenge", Journal of Animal Science 79.5 : 1272-1279.
Hilakivi-Clarke L, Cho E, Onojafe I, et al. "Maternal exposure to genistein during pregnancy increases carcinogen-induced mammary tumorigenesis in female rat offspring". Oncol Rep. 1999;6:1089-1095.
Setchell, K. Absorption and Metabolism of Soy Isoflavones—from Food to Dietary Supplements and Adults to Infants J. Nutr. 2000 130: 3 654S-655S.
Xiao, Yi; Mao, Xiangbing; Yu, Bing; He, Jun; Yu, Jie; Zheng, Ping; Huang, Zhiqing; Chen, Daiwen, "Potential risk of isoflavones: toxicological study of daidzein supplementation in piglets", Journal of Agricultural and Food Chemistry 63.16 : 4228-4235.
Zoppi G, Guandalini S. "The story of soy formula feeding in infants: a road paved with good intentions", J Pediatr Gastroenterol Nutr. 1999;28:541-543.
Zoppi G, Mantovanelli F, Pittschieler K, Delem A, Teuwen DE. "Response to RIT 4237 oral rotavirus vaccine in human milk, adapted- and soy-formula fed infants", Acta PaediatrScand. 1989;78:759-762.
Zoppi G, Zamboni G, Bassani N, Vazzoler G. Gammaglobulin level and soy-protein intake in early infancy. Eur J Pediatr. 1979;131:61-69.
Zoppi G. "Soy milk feeding and the immune system", Lancet 1983;2:861.
Messina, Mark, "Brief Overview of the Health Effects of Isoflavones", Soy Nutrition Institute, Apr. 7, 2016, 27 pages.
SciFinder | Cas Reg. No. 446-72-0 for Genistein. Accessed 2019. (Year: 2019).

* cited by examiner

*Primary Examiner* — Erik Kashnikow
*Assistant Examiner* — Assaf Zilbering
(74) *Attorney, Agent, or Firm* — Dorsey & Whitney LLP

(57) ABSTRACT

Isoflavone-supplemented milk replacers fed to young animals during a pre-weaning provides isoflavones in the milk replacer at a level of about 700 mg per kilogram of the milk replacer, and/or provides about 450 mg of the supplemental isoflavone in at least about 1.5 pounds of the milk replacer by dry weight such that the animal ingests this amount of the isoflavone per day, and/or provides in the milk replacer at least about 50 mg of isoflavone per pound of the animal's birth weight is ingested per day. In response to ingesting the isoflavone-supplemented milk replacer, the young animal experiences improved performance.

7 Claims, No Drawings

ISOFLAVONE-SUPPLEMENTED MILK REPLACERS AND SYSTEMS AND METHODS OF FEEDING SAME TO YOUNG ANIMALS

TECHNICAL FIELD

The present disclosure relates generally to milk replacers for young animals supplemented with isoflavones and systems and methods of feeding young animals such milk replacers.

BACKGROUND

The time it takes livestock animals to mature to a stage where the animal can produce milk or meat is important in the livestock commodity market. A number of feeding systems have been used to enhance weight gain of livestock beginning at a young age, and may include feeding techniques prior to and after weaning. Such techniques may involve providing milk replacers to the animals that generally mimic the milk produced from the post-partum parent animal in terms of protein, fat and carbohydrate content. The milk replacer may be supplemented with vitamins, minerals, medication and other compositions that may benefit the young animals. This may, for example, reduce the age of freshening or the onset of lactation of a dairy cow or sow, thereby reducing the cost of milk production. Increased weight gain of livestock from an early age may also reduce the cost of beef and pork production.

SUMMARY

Implementations provide methods of feeding young animals an isoflavone-supplemented milk replacer. According to certain embodiments, a method involves providing a milk replacer to a young animal for at least one week during a pre-weaning phase in which the animal ingests or primarily ingests the milk replacer, the milk replacer comprising a supplemental level of isoflavone added to the milk replacer of about 700 mg per kilogram of the milk replacer. Another method involves providing the young animal at least about 1.5 pounds of the milk replacer by dry weight per day during the aforementioned period, where a supplemental level of isoflavone added to the milk results in about 450 mg of the supplemental isoflavone being ingested by the young animal per day. Another method involves providing the milk replacer during this time period where a supplemental level of isoflavone added to the milk replacer such that the animal is provided in the milk replacer at least about 50 mg of isoflavones per pound of their birth weight per day. In response to ingesting the isoflavone-supplemented milk replacer for the time period, according to these methods, the young animal experiences improved performance.

According to certain implementations and alternatives, the young animal is provided the milk replacer for about three weeks. In further implementations and alternatives, the protein in the milk replacer is derived from all-milk proteins, non-milk proteins, or a combination. In such implementations and alternatives, a protein level in the milk replacer may be at least about 18 percent by dry weight.

According to certain implementations and alternatives, the improved performance experienced by the animal is one or more of an improved weight gain, an improved average daily gain, an improved feed intake, or an improved feed to gain ratio.

According to certain implementations and alternatives, the isoflavone supplement may an isoflavone isolate derived from soy, may comprises isoflavone aglycone, which may in part be in the form of genistein aglycone.

DETAILED DESCRIPTION

Isoflavones are plant-based, water-soluble plant flavonoids that can have a phytoestrogen effect, meaning that isoflavones can have effects on the body similar to estrogen due to the ability of isoflavones to bind to estrogen receptors. Isoflavones may sometimes be referred to as phytoestrogen isoflavones. Much research has been conducted to better understand the concerns and benefits of human consumption of isoflavones. Several benefits to adolescent and adult humans have been attributed to isoflavone supplementation. These benefits include cancer inhibition and reduction of issues associated with menopause (bone density, heat flashes and depression). However, the effects of consuming isoflavones may be different, even contrary to that of estrogen. In addition, no research has been conducted with milk-fed healthy neonates. This lack of research on isoflavones may be in response to concerns raised after the intensive use of soy products or isoflavones by pregnant women could exert a hormonal effect that impacts unborn fetuses. (Proceedings and abstracts. 3rd International Symposium on the Role of Soy in Preventing and Treating Chronic Disease. Washington D.C., USA. Oct. 31-Nov. 3, 1999. J Nutr. 2000; 130: 653S-711S; Hilakivi-Clarke L, Cho E, Onojafe I, et al. Maternal exposure to genistein during pregnancy increases carcinogen-induced mammary tumorigenesis in female rat offspring. Oncol Rep. 1999; 6:1089-1095.) In addition, there are several reports of impaired immune responses in infants fed soy formula. (Zoppi G, Guandalini S. The story of soy formula feeding in infants: a road paved with good intentions. J Pediatr Gastroenterol Nutr. 1999; 28:541-543; Zoppi G, Mantovanelli F, Pittschieler K, Delem A, Teuwen D E. Response to RIT 4237 oral rotavirus vaccine in human milk, adapted- and soy-formula fed infants. Acta Paediatr Scand. 1989; 78:759-762; Zoppi G. Soy milk feeding and the immune system. Lancet. 1983; 2:861; Zoppi G, Zamboni G, Bassani N, Vazzoler G. Gammaglobulin level and soy-protein intake in early infancy. Eur J Pediatr. 1979; 131:61-69)

Implementations herein provide for isoflavone-supplemented milk replacers and systems and methods of feeding the milk replacers to young livestock animals. These may be healthy young animals. Young livestock animals that may ingest the isoflavone-supplemented milk replacers include but are not limited to young non-human mammals, young ruminants (e.g., lambs, kids and deer, in addition to calves) and young monogastrics (e.g., foals and piglets). Animal studies assessing the merit of supplementing isoflavones in animal milk replacers were conducted by the inventor and the results reported herein. The findings were dramatic and unexpected. Particularly, it has been discovered that milk-fed neonate mammals improve performance when fed supplemental levels of isoflavones via milk replacer.

The isoflavones of the present disclosure may be sourced from soy, red clover, other plants and combinations of these. Isoflavones include but are not limited to: glycitein, genistein, daidzein, biochanin and formonenetin. Soybeans contain high levels of isoflavones, particularly glycitein, genistein and daidzein. Red clover contains genistein, daidzein, biochanin (a genistein derivative) and formonenetin (a daidzein derivative). These isoflavones can be present in at least two forms: as a glycoside (e.g., glucoside or glucuronide) or as an aglycone. For isoflavone glycoside, the isoflavone is attached to a glycone, which is a sugar, and may be present in soy products such as raw soy products. For isoflavone aglycone, the isoflavone is present without any glycone attached, and may be referred to as a free isoflavone. Isoflavone aglycone may be present in soy products such as fermented soy products. Genistein aglycone may be the predominant bioactive form of the isoflavones.

Isoflavones, both glycosides and aglycones, may be isolated from their source plants as an isolate. Isoflavones may be available in powder form and may be mixed with milk replacers. Isoflavones may be supplemented in milk replacers before or after hydration of the milk replacers.

In some implementations, the isoflavone supplement may contain one or a combination of glycitein, genistein, daidzein, biochanin and formonenetin. In some implementations, one or more isoflavones may be isolated from other isoflavones and provided as the isoflavone supplement to the milk replacers of the present disclosure. For instance, genistein aglycone derived from soy may be isolated from other soy-containing isoflavones, such as glycitein and/or daidzein and may be provided as the supplement.

In another example, the isoflavone supplement may contain a mixture of genistein, daidzein and glycitein, and the supplement may be derived from soy. In this example, genistein may account for about 51 percent of the isoflavones, daidzein may account for 36 percent of the isoflavones, and glycitein may account for 13 percent of the total isoflavones in the supplement. In other examples, the isoflavones in the supplement may be provided in different ratios or combinations. For instance, genistein, as a glycoside or aglycone, may be provided alone or in combination with daidzein or glycitein as a glycoside or aglycone. In this example, genistein may account for 1 to 100 percent, 1 to 90, 1 to 80, 1 to 70, 1 to 60, 1 to 50, 1 to 40, 1 to 30, 1 to 20, or 1 to 10 of the isoflavone, with any balance being provided by daidzein, glycitein or both. Alternatively, daidzein or glycitein may be provided in the preceding amounts, with any balance being provided by genistein or the other of the daidzein or glycitein, or a combination.

The amount of isoflavone used to supplement the milk replacers of the present disclosure may be an amount that is effective to improve performance of the young animal. In some implementations, this amount may be at least about 700 mg/kg (or about 318 mg/lb.) of milk replacer by dry weight and up to about 5000 mg/kg (or about 2272 mg/lb.) or more, e.g., 10,000 mg/kg, of milk replacer by dry weight. In some implementations, the effective amount may be about 1500 mg/kg (or about 682 mg/lb.) of milk replacer by dry weight. In some examples the amount of isoflavone supplement may be about 700 mg/kg to about 4000 mg/kg, about 700 mg/kg to about 3000 mg/kg, about 700 mg/kg to about 3000 mg/kg, about 700 mg/kg to about 2500 mg/kg, about 700 mg/kg to about 2000 mg/kg, about 1000 mg/kg to about 2500 mg/kg, about 1200 mg/kg to about 3000 mg/kg, about 1000 mg/kg to about 3000 mg/kg, about 1500 mg/kg to about 3000 mg/kg, about 1500 mg/kg to about 2500 mg/kg, about 700 mg/kg, about 800 mg/kg, about 900 mg/kg, about 1000 mg/kg, about 1500 mg/kg, about 2000 mg/kg, about 2500 mg/kg, about 3000 mg/kg, about 4000 mg/kg or about 5000 mg/kg of milk replacer by dry weight.

In some approaches, the isoflavone supplementing the milk replacers may be provided in a daily feed ration for the young animal. For instance, the young animal may ingest at least about 450 mg and up to about 3,400 mg of the supplemental isoflavone per day when fed at least about 1.5 pounds of milk replacer by dry weight. In some approaches, the animal may ingest at least about 450 mg of the supplemental isoflavone on a daily basis. In some examples the amount of isoflavone supplement may be fed at about 450 mg to about 3000 mg, about 450 mg to about 2500 mg, about 450 mg to about 2000 mg, about 450 mg to about 1500 mg, about 450 mg to about 1000 mg, about 500 mg to about 2500 mg, about 800 mg to about 2000 mg, about 7000 mg to about 2000 mg, about 1000 mg to about 2000 mg, about 1000 mg to about 1700 mg, about 500 mg, about 600 mg, about 700 mg, about 800 mg, about 900 mg, about 1000 mg, about 1500 mg, about 2000 mg, about 2500 mg, about 3000 mg, about 4000 mg or about 5000 mg per day when fed at least about 1.5 pounds of milk replacer by dry weight. In further examples, these amounts of isoflavone may be used to supplement more or less quantities milk replacer to be fed on a daily basis, such as a daily rate of about 0.75 pounds of milk replacer, or a daily rate of at least about 1.6 and up to 2.5 pounds of milk replacer.

In some approaches, the isoflavone supplementing the milk replacers may be provided to the young animal according to birth weight, e.g., actual birth weight or an average birth weight for the animal. For instance, the young animal may be fed about 50 mg to about 350 mg per pound of the animal at birth per day. In this approach, a young animal such as a piglet weighing 3.4 lbs. at birth may ingest about 170 mg to about 1200 mg of the isoflavone supplement per day. For a calf with an average birth weight of about 70 to about 105 lbs., the calf may ingest about 3,500 mg to about 36,750 mg of the isoflavone supplement per day. In other examples, the young animal may be fed about 50 to about 300 mg, about 50 to about 200 mg, about 50 to about 170 mg, about 50 to about 160 mg, about 50 mg to about 150 mg, about 60 mg, about 70 mg, about 80 mg, about 90 mg, about 100 mg, about 100 mg, about 125 mg, about 150 mg, about 170, about 175 mg, about 180 mg, about 190 mg, about 200 mg, about 225 mg, about 250 mg, about 300 mg, or about 325 mg per pound of the animal's birth weight per day.

The isoflavone-supplemented animal milk replacers of the present disclosure are milk replacers that contain a blend of protein and fat in an amount that mimics milk produced by the female of the species of the target young animal, which have been supplemented with isoflavones. The animal milk replacers may be formulated with conventional amounts of protein and fat, and for instance, may contain protein at about 18 to 25 percent by dry weight, and fat at about 18 to 22 percent by dry weight. Most conventional milk replacers contain all-milk proteins that are typically derived from cow's milk. Some conventional milk replacers contain non-milk proteins from other sources such as soy.

Isoflavone-supplemented milk replacers formulated as high potential milk replacers typically contain protein at a level of at least 22 percent by dry weight, such as about 22 to 30 percent by dry weight, and fat at about 18 to 24 percent by dry weight. Protein sources may be from all-milk proteins, non-milk proteins or a combination of non-milk proteins and all-milk proteins.

As provided, isoflavone-supplemented milk replacers contain a blend of protein and fat. In some milk replacers, these nutrients may be derived from soybeans. For instance one or more of hydrolyzed soy protein modified, soy protein concentrate or soy protein isolate may be present as a source of non-milk protein in milk replacers. Because soybeans naturally contain isoflavones, some isoflavones may be present in milk replacers that derive a portion of the nutrients from soy. However, a portion of the naturally-present isoflavones may be washed out during processing of soy into a form where it is usable for a milk replacer. For instance, soy protein concentrate is prepared from dehulled soybean seeds by removing most of the oil and water-soluble non-protein constituents, including isoflavones, such as through alcohol extraction, resulting in insubstantial levels of isoflavones being present in soy protein concentrate, e.g. about 0.047 mg/g or less of soy protein concentrate. Soy protein isolate generally includes similar levels of isoflavones compared to soy protein concentrate. Hydrolyzed soy protein modified is produced using techniques that allow a substantial portion of the original isoflavones to be retained, e.g., approximately 3.65 mg/g of hydrolyzed soy protein modified. Soybean meal, which may be processed into soy flour and added to milk replacer, retains much of its native isoflavones and generally contains about 3.41 mg/g of the soybean meal. Thus, relatively higher levels of isoflavones may be contained in milk replacers containing these forms of soy protein. Consequently, implementations herein are directed to isoflavone-supplemented milk replacers in which the level of isoflavones present in the milk replacer is a supplemental level where isoflavones have been added to the milk replacer regardless of the source of protein or other nutrients. Supplemental levels of isoflavones are above that which could naturally be present when a portion or all of a nutrient or nutrients in the milk replacer is derived from soy. All-milk protein milk replacers do not contain isoflavones.

In some implementations, the protein in the milk replacers of the present disclosure may be all-milk proteins. In further implementations, the protein may be sourced from non-milk protein sources, such as soy protein. When non-milk protein, e.g., soy protein, wheat protein, blood protein, egg protein, is present, the non-milk protein may provide about 65 percent of the protein by dry weight or less. In some implementations, when non-milk protein sources are used, they may be provided at about 1 percent of the protein by dry weight and up to about 65 percent of the protein by dry weight. In some examples, the amount of non-milk protein may be about 1 to about 60 percent, about 1 to about 50 percent, about 1 to about 40 percent, about 1 to about 30 percent, about 1 to about 20 percent, about 1 to about 10 percent, about 1 to about 5 percent, about 1, about 2, about 3, about 4, about 5, about 6, about 7, about 8, about 9 about 10, about 15, about 20, about 30, about 40, about 50, about 55, about 60, or about 65 percent of the total protein in the milk replacer by dry weight.

In some implementations, such as when protein in the milk replacer is sourced from soy protein, other non-milk proteins may be excluded from the milk replacer. For instance, the isoflavone-supplemented milk replacers may be free of any or all of wheat protein, fish meal, gut protein, potato protein, egg protein, egg, blood plasma, red blood cells, or protein derived from blood or plasma.

Feeding isoflavone-supplemented milk replacers may involve ad libitum feeding, feeding at conventional rates, feeding at enhanced feeding rates, or a variant thereof. Ad libitum feeding involves providing access to the milk replacer at the animal's leisure. This approach may involve replenishing the milk replacer supply throughout the day. For instance, the young animal may be offered multiple feedings per day, such as two feedings, in order to maintain a fresh supply of reconstituted milk replacer for the animal to access ad libitum. A variant of ad libitum feeding is 95% of ad libitum feeding, where the animal ingests 95 percent of the milk replacer that would be ingested if offered free choice. Conventional rates for feeding milk replacers may be up to about 1.5 pounds per head per day on a dry weight basis when fed two meals per day. In the conventional setting, the animal may ingest about 0.75 pounds per head per day for the first week of life or, in some examples, during a first week of treatment by a single daily feeding, and then at a rate of about 1.5 pounds per head per day by two feedings daily until the onset of weaning. Milk replacers may be provided at an enhanced rate, such as about at least 1.6 to 2.5 pounds per day, and preferably at about 1.8 pounds per day during about the first week of life or during a first week of treatment and at 2.5 pounds per day from week two through the onset of weaning. In some implementations, the amounts fed at conventional and enhanced rates may be for young ruminants, such as calves. At the onset of weaning, the animal is typically fed one meal per day and ingests about half the amount of milk replacer ingested just prior to the onset of weaning when conventional and enhanced feeding regimens are followed.

In addition to feeding isoflavone-supplemented milk replacers, young animals may be offered starter feed, which is solid feed containing a mixture of grains and nutrients that the animal ingests typically ad libitum. The rate of ingestion of starter feed is generally low during the first few weeks of life and gradually increases through weaning as the animal naturally transitions from an all liquid diet to solids diet, for instance, comprised of forages and grains. Starter feed may contain about 18 to about 22 percent crude protein, may be texturized, pelleted and/or medicated.

The young animals fed the isoflavone-supplemented milk replacers of the present disclosure may be in a pre-weaning phase, a weaning phase or both. In a pre-weaning phase, the animal generally ingests liquids, primarily milk replacer, and is offered starter feed. The pre-weaning phase typically starts at birth and extends until the onset of weaning, which is about six to about eight weeks of age or another period common to young animals. The pre-weaning animal is typically fed two meals of the milk replacer per day. The onset of weaning initiates the weaning phase and is generally when young animals are encouraged to consume only dry feed and occurs over the course of about 3 days. During this phase, the animal is fed about half of the amount of milk replacer relative to the amount provided during the pre-weaning phase and is typically fed as one meal of the milk replacer per day. Generally calves and other young ruminants are fully weaned after about 56 days and piglets are generally weaned after about 21-24 days from birth, and prior to being fully weaned, may ingest isoflavone-supplemented milk replacers in the diet. In some approaches, the young animals may ingest the isoflavone-supplemented milk replacers during a feeding period within a portion of the pre-weaning phase or prior to weaning. For instance, the young animal may ingest such milk replacers for about or for at least one, two, three four, five six or seven weeks during the pre-weaning phase or prior to weaning. In another example, the isoflavone-supplemented milk replacers may be fed during a feeding period of about or of at least one, two, three, four, five, six or seven weeks beginning from about birth. In these approaches, the young animal may ingest the isoflavone-supplemented milk replacer starting at about 1 to 5 days of age, about 1 to about 3 days of age, or about 1 to about 2 days of age and may consume the milk replacer for the prescribed feeding period.

In use, the hydrated, isoflavone-supplemented milk replacer may be added to bottles or added to bulk tanks and fed to young animals during mealtime. Depending on the stage of life, the young animal may consume about one or two meals per day.

In response to ingesting the isoflavone-supplemented milk replacer, young animals improve performance. Improved performance may include, but is not limited to:

improved weight gain, improved weight gain over a feeding period, improved average daily gain, improved average daily gain over a feeding period, improved intake, improved intake over a feeding period, improved dry matter intake (e.g., starter), improved dry matter intake over a feeding period, improved feed efficiency, improved feed efficiency over a feeding period, and improved health (e.g., reduced scour scores). The improved performance may be realized after a feeding period. The improved performance may not depend on the protein source in the milk replacer, meaning that the protein in the milk replacer may be from all-milk proteins, soy proteins, other non-milk proteins, or a combination, while still realizing the improved animal performance in response to ingesting the isoflavone-supplemented milk replacer.

In some particular examples, in response to ingesting the isoflavone-supplemented milk replacer, weekly weights of animals receiving supplemental isoflavone may increase during a three week feeding period beginning at about day one to two of life, and in some examples, weekly weights may increase significantly for at least a portion of this period. Average daily gain may increase during such a three week feeding period for young animal receiving the supplemental isoflavone. Total average daily gain by young animals fed milk replacers supplemented with isoflavone may also be improved for all or a portion of such a feeding period. Weekly gains by animals receiving supplemental isoflavone may increase or increase significantly for the three week period. For instance, total gain by animals receiving milk replacer supplemented with isoflavone may improve by about 20 percent. Weekly milk replacer intake may increase for this three week period, and may significantly increase for a two-week portion of this period. Total milk replacer intake may increase by about 10 percent. Feed efficiency may also be improved for this feeding period or a portion thereof. Average diarrhea scores may be reduced showing the health of the animal is not negatively affected by the inclusion of supplemental isoflavone in the diet.

EXAMPLE

Young, healthy, neonates were studied to determine the effects of feeding isoflavones in the diet. Although benefits flowing from piglets ingesting isoflavone-supplemented milk replacers are disclosed in this Example, the Example should not be construed as limiting and other animals and feeding approaches disclosed herein may benefit from the feeding methods and systems of the Example, Materials and Methods: Twenty four (24) two-day old piglets weighing approximately 3-3.5 pounds, from the Purina Animal Nutrition Center Swine Group, were randomized and blocked by weight and sex to dietary treatments. Piglets were selected from 2-3 litters on the same farrowing date. Piglets remained with the sow for two days prior to being moved to the Piglet Milk Replacer Room. Piglets were housed in open top, raised pens measuring 2'×3'. Room temperature was recorded daily. Pigs were monitored for signs of cold or heat stress. Piglets were obtained on the afternoon of day two. Piglets had ad libitum access to water. Piglets had immediate access to milk upon being placed in the new building. Milk replacer treatments were fed at 95% of ad libitum to each pig.

From day one of the trial, all piglets were fed experimental milk replacers containing 25 percent protein, 20 percent fat. Milk replacer was reconstituted with 110° F. water and offered fresh twice daily. The milk replacer powder was fed as a 12.5% solids solution. Two milk replacer diets were formulated where 50% of the protein was derived from hydrolyzed soy protein modified (HSPM) or soybean protein concentrate (SPC). The remainder of the protein in these milk replacers obtained from bovine milk ingredients, e.g., all-milk protein. These two milk replacers were offered without and with supplemented with isoflavones (supplemental ISF). Thus four dietary treatments were employed in this Example. Treatments were: 1) HSPM; 2) HSPM with supplemental ISF; 3) SPC: and 4) SPC with supplemental ISF. A human isoflavone product (NovaSoy 400, Archer Daniels Midland Co.) was employed to supplement the diets 2 and 4 (1500 mg/kg added ISF). NovaSoy 400 is a 40% soy isoflavone product containing a aglycone ratio similar to that contained in the soybean. The process employed to produce SPC results in the extraction (washing out) of much of the ISF. Thus, the milk replacer in treatments 3 and 4 including SPC had a lower natural ISF level, and thus overall ISF level, than that of the HSPM diet. Calculated total ISF level for the milk replacers fed in treatments 1-4 was approximately 830, 2330, 8 and 1508 mg/kg milk replacer, respectively. Thus, the supplemental ISF level of treatments 2 and 4 are 1500 mg/kg of milk replacer. The level of ISF in treatments 1 and 3 being 830 and 8 mg/kg milk replacer, respectively, reflect the base or innate levels of ISF in the milk replacer containing the two different soy proteins.

Results:

Performance data for piglets fed these treatments is presented in Table 1.

TABLE 1

Milk Replacer Treatments 1-HSPM, 2-HSPM 1500 ISF, 3-SPC, and 4-SPC 1500 ISF

| | Treatment | | | | | Contrast P-values | | |
|---|---|---|---|---|---|---|---|---|
| Item | 1 HSPM | 2 HSPM 1500ISF | 3 SPC | 4 SPC 1500ISF | P-value | HSPM vs. SPC | 0 vs. 1500 | interaction |
| # of piglets | 6 | 6 | 6 | 6 | | | | |
| Initial wt., lb | 3.3983 | 3.3567 | 3.4117 | 3.3317 | 0.9976 | 0.9851 | 0.8461 | 0.9512 |
| Wt. wk 1, lb | 6.02 | 6.33 | 5.9033 | 6.37 | 0.7641 | 0.9185 | 0.3061 | 0.8344 |
| Wt. wk 2, lb | 10.2917 | 10.33 | 8.8017 | 10.893 | 0.022 | 0.3126 | 0.0273 | 0.0327 |
| Wt. wk 3, lb | 14.6617 | 15.5983 | 12.8617 | 15.882 | 0.0167 | 0.261 | 0.0068 | 0.1277 |
| Wk 1 ADG, lb | 0.3745 | 0.4248 | 0.356 | 0.434 | 0.1778 | 0.8711 | 0.0343 | 0.6273 |
| Wk 2 ADG, lb | 0.6102 | 0.5714 | 0.414 | 0.6462 | 0.0398 | 0.2906 | 0.0993 | 0.025 |
| Wk 3 ADG, lb | 0.6243 | 0.7526 | 0.58 | 0.7126 | 0.0292 | 0.3192 | 0.0049 | 0.9591 |
| Total ADG, lb | 0.5363 | 0.5829 | 0.45 | 0.5976 | 0.005 | 0.2085 | 0.0021 | 0.0819 |

TABLE 1-continued

Milk Replacer Treatments 1-HSPM, 2-HSPM 1500 ISF, 3-SPC, and 4-SPC 1500 ISF

| | Treatment | | | | | Contrast P-values | | |
|---|---|---|---|---|---|---|---|---|
| | | 2 | | 4 | | | | |
| Item | 1 HSPM | HSPM 1500ISF | 3 SPC | SPC 1500ISF | P-value | HSPM vs. SPC | 0 vs. 1500 | interaction |
| Wk 1 gain, lb | 2.6217 | 2.9733 | 2.4917 | 3.0383 | 0.1778 | 0.8711 | 0.0343 | 0.6273 |
| Wk 2 gain, lb | 4.2717 | 4.0 | 2.8983 | 4.5233 | 0.0398 | 0.2906 | 0.0993 | 0.025 |
| Wk 3 gain, lb | 4.37 | 5.2683 | 4.06 | 4.9883 | 0.0292 | 0.3192 | 0.0049 | 0.9591 |
| Total gain, lb | 11.2633 | 12.2417 | 9.45 | 12.55 | 0.005 | 0.2085 | 0.0021 | 0.0819 |
| Wk 1 DM of MR intake, lb | 2.0365 | 2.1545 | 2.0475 | 2.1185 | 0.773 | 0.8941 | 0.3204 | 0.8026 |
| Wk 2 DM of MR intake, lb | 3.4678 | 3.6808 | 2.9493 | 3.6908 | 0.031 | 0.1793 | 0.0167 | 0.1635 |
| Wk 3 DM of MR intake, lb | 5.3278 | 5.8183 | 4.9168 | 5.7155 | 0.0116 | 0.1872 | 0.0027 | 0.4222 |
| Total DM of MR intake, lb | 10.832 | 11.6535 | 9.9135 | 11.525 | 0.0155 | 0.1832 | 0.0045 | 0.3109 |
| Feed: Gain, lb | 0.9687 | 0.9582 | 1.0635 | 0.9188 | 0.051 | 0.4369 | 0.0381 | 0.0696 |
| Wk 1 scour score | 2.8611 | 2.95 | 3.1778 | 3.0167 | 0.4376 | 0.1789 | 0.7956 | 0.3744 |
| Wk 2 scour score | 3.1806 | 3.1944 | 3.1389 | 2.9722 | 0.2952 | 0.1537 | 0.4008 | 0.3225 |
| Wk 3 scour score | 3.0417 | 2.9167 | 3.0972 | 3.0139 | 0.4327 | 0.3347 | 0.1927 | 0.7902 |
| Total avg. scour score | 3.0381 | 3.0248 | 3.1348 | 2.9962 | 0.4783 | 0.6057 | 0.2554 | 0.346 |

Summary of Results:

Supplemental isoflavone added to HSPM or SPC-containing milk replacers significantly enhanced piglet performance in this three-week evaluation. The bold numbers in Table 1 indicate the results are statistically significant, i.e., have a P-value of 0.10 or lower. References to P-values are for the 0 vs. 1500 column unless otherwise stated. Weekly weights by piglets receiving supplemental isoflavone in milk replacer were increased for weeks one through three, and increased significantly for weeks two and three of the study (P=0.0273 and 0.0068, respectively). Average daily gain increased for each of weeks one through three for piglets receiving the supplemental isoflavone in milk replacer (P=0.0343, 0.0993 and 0.0049, respectively). Total average daily gain by piglets receiving milk replacer supplemented with isoflavone was improved (P=0.0021). Weekly gains by piglets receiving supplemental isoflavone in milk replacer were increased significantly for weeks one through three of the study (P=0.0343, 0.0993 and 0.0049, respectively). Total gain by piglets supplemented with isoflavone in milk replacer was improved (P=0.0021) by nearly 20 percent. Weekly milk replacer intake on a dry matter basis was increased for weeks one through three, and significantly increased for weeks two and three of the study (P=0.0167 and 0.0027, respectively). Total milk replacer intake on a dry matter basis was increased by almost 10% (P=0.0045) for pigs fed milk replacers containing added isoflavone. Interestingly, feed efficiency of piglets fed isoflavone-supplemented replacers was also improved (P=0.0381). Average diarrhea scores tended to be reduced in this study (P=0.2554) illustrating the health of the piglet was not negatively affected by the inclusion of supplemental isoflavone in the diet. Animals ingesting base levels of isoflavones within milk replacers also experienced improved performance as compared to animals ingesting milk replacers substantially free of isoflavones (compare e.g., treatments 1 and 3), illustrating that inclusion of isoflavones at levels of approximately 800 mg/kg of milk replacer on a dry matter basis or possibly lower levels achieves improvements. Animals ingesting higher levels of isoflavone performed better than those ingesting relatively lower levels of isoflavone, as reflected by the contrast P-value Interactions column. For instance, total average daily gain, total gain, and feed to gain ratio (P=0.0819, 0.0819 and 0.0696, respectively) illustrate that for animals ingesting milk replacers containing higher base levels of isoflavones along with an isoflavone supplement, as in treatment 2 where the animal ingested hydrolyzed soy protein modified milk replacer supplemented with 1500 mg isoflavones per kg of milk replacer, performed better than animals ingesting lower levels of isoflavones.

These data indicate the isoflavone supplementation can enhance the performance of milk-fed neonates. Both performance and health of such animals fed isoflavones were improved by the addition of isoflavone. These improvements may be without regard to the type of milk replacer fed to the animal, as reflected by the contrast P-values in the HSPM vs. SPC column showing that the differences in animal performance were not based on the type of base milk replacer fed.

Although the present disclosure provides references to preferred embodiments, persons skilled in the art will recognize that changes may be made in form and detail without departing from the spirit and scope of the invention.

What is claimed is:

1. A method of feeding a piglet an isoflavone-supplemented milk replacer comprising:
   providing a milk replacer to a piglet on a daily basis during at least two weeks of a pre-weaning phase in which the piglet ingests the milk replacer, the milk replacer comprising an isoflavone supplement added to the milk replacer, the isoflavone supplement providing a supplemental level of isoflavone comprising about 700 mg per kilogram of the milk replacer, wherein in response to ingesting the isoflavone-supplemented milk replacer for one week to three weeks, the piglet experiences improved performance, wherein the isoflavone supplement is a powdered isoflavone extract derived from soy, wherein the powdered isoflavone extract comprises one or more soy-derived isoflavones isolated from one or more other soy-derived isoflavones excluded from the powdered isoflavone extract, wherein the one or more other soy-derived isoflavones excluded from the powdered isoflavone extract comprise glycitein.

2. The method of claim 1, wherein the piglet is provided the milk replacer on the daily basis for about three weeks during the pre-weaning phase.

3. The method of claim 1, wherein protein in the milk replacer is derived from all-milk proteins, non-milk proteins, or a combination.

4. The method of claim 3, wherein a protein level in the milk replacer is at least about 18 percent by dry weight.

5. The method of claim 1, wherein the improved performance experienced by the piglet is one or more of an improved weight gain, an improved average daily gain, an improved feed intake, or an improved feed to gain ratio.

6. The method of claim 1, wherein the one or more soy-derived isoflavones of the powdered isoflavone extract comprise an aglycone form of isoflavone.

7. The method of claim 6, wherein the aglycone form of isoflavone comprises genistein aglycone and the one or more other soy-derived isoflavones further comprise daidzein.

\* \* \* \* \*